July 30, 1968   J. T. FREEMAN   3,394,587
WEB TENSION INDICATOR
Filed March 9, 1966
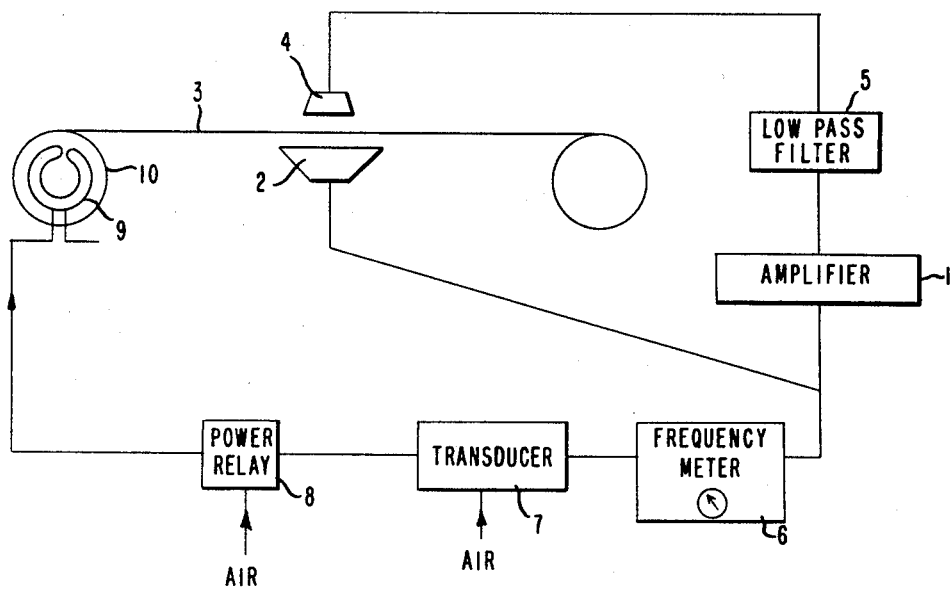
INVENTOR
JOHN THOMAS FREEMAN
BY *William B. Coughlin, Jr.*
ATTORNEY

United States Patent Office 3,394,587
Patented July 30, 1968

3,394,587
WEB TENSION INDICATOR
John Thomas Freeman, Freehold, N.J., assignor to E. I. du Pont de Nemours and Company, Wilmington, Del., a corporation of Delaware
Filed Mar. 9, 1966, Ser. No. 532,913
6 Claims. (Cl. 73—143)

ABSTRACT OF THE DISCLOSURE

A noncontacting apparatus for measuring the tension on a web. The tension on a vibrating web is related to the length, mass and frequency of vibration. Where the length and mass are known, the tension may be measured by measuring the frequency of the web. This apparatus has a speaker driven by an amplifier which vibrates a column of air adjacent to the web forcing the web to vibrate at its resonant frequency then the frequency of vibration is measured by a microphone.

---

This invention relates to a tension measuring and control device and more particularly to a tension measuring device for a continuous web.

Proper web tensioning is needed during winding of a web because a tension which is too low can cause poor tracking of the web over the rolls as well as wrinkles forming along the edges which cause high selvage losses. A tension which is too high may cause scalloped edges which generally appear after treatment of the web.

Desirable features of a tension measuring device for a web are economy, simplicity, durability, ease of installation, and maintenance accuracy and non-contacting of the device with the web. Many tension devices are known that contact the material being measured but this is detrimental to a web because scratching and scarring occur to the web.

The novel tension sensing device of this invention comprise a non-contacting tension detecting means responsive to air vibrations induced by the vibration of the web, amplifying means for increasing the power of vibrations received by said detector, driving means which is actuated by the power output of said amplifier and induces air vibrations against the web, metering means to signal the frequency of said web vibrations, and monitoring means for determining changes in frequency of said web.

The figure is a block-flow schematic of the integrated invention utilizing automatic tension control.

With reference to the figure, this invention in general is comprised of an amplifier 1, driving a speaker 2, which forces web 3 into vibration. Sensory microphone 4 picks up the actual frequency of vibration of the web and sends this signal to a low pass filter 5 and on to the input of amplifier 1.

The output of the amplifier 1 is used to activate drive speaker 2 and also as a signal to monitor and control tension. A preferred method of tension control is comprised of a frequency meter 6, a reverse acting electro-pneumatic transducer 7, a pneumatic power relay 8, a pneumatic brake 9, and a pneumatic supply. The frequency meter 6 will convert the output frequency of amplifier 1 into a voltage signal and feed this voltage signal to the reverse acting electro-pneumatic transducer 7. Transducer 7, in turn, compares the output voltage signal from the frequency meter 6 with a constant voltage representing the desired tension signal and converts any difference in voltage to a change in pneumatic pressure. If no change is required, the initial pneumatic tension signal is constantly emitted from transducer 7. This pneumatic signal is sent to a pneumatic power relay 8. The pneumatic power relay 8 multiplies the transducer's signal and this multiplied signal is directly applied to air brake 9 which acts on feed roll 10. The braking effect on feed roll 10 controls the tension in web 3.

Theoretically, the fundamental formula for the natural period of vibration of a web or thread is $$F = \frac{1}{2L}\sqrt{\frac{T}{M}}$$

where $F$ = fundamental frequency,
$L$ = length of the web,
$M$ = mass per unit length, and
$T$ = tension.

This formula serves as the basis for the operation of this invention. Where the length and the mass per unit length of the web are constant, the fundamental frequency of the web is related to tension. These conditions are achieved in this invention by noting the following. The distance between feed roll 10 and takeup roll 11 represents L, the length of the vibrating web 3 and this dimension remains constant. The mass per unit length of a uniform web is a constant. Therefore, when the web is forced to vibrate its frequency provides a means of measuring its tension of the web.

The process of effecting forced vibration begins as follows. The amplifier is turned on and any low frequency signal from the room background noise is picked up by the sensory speaker 4, amplified, and fed to the driver. The amplifier gain is advanced until this background noise, within the frequency range which will pass through the low pass filter, causes the web to vibrate. Web vibration ensues because the driving speaker vibrates, causing the surrounding air to vibrate, and the air, in turn, acts upon the web causing the web to vibrate.

The web immediately seeks resonant frequency, that is, the particular frequency that gives the maximum amplitude for the forced vibration of the system at a particular tension. This resonant frequency overrides the initial frequency of the noise source (e.g., background noise) and the entire system almost instantaneously snaps into the resonant frequency of the web at the particular tension which is on the web. In practice, it has been found that the web vibrating at its resonant frequency is in one of its harmonics rather than its fundamental frequency. The harmonic frequencies are integral multiples of the fundamental. For example, if a web has a fundamental frequency of 40 cycles per second and it is vibrating in its third harmonic it will record a frequency of 120 cycles per second. Being that the basic formula, $$F = \frac{1}{2L}\sqrt{\frac{T}{M}}$$

defines only the fundamental frequency it is therefore necessary to determine what harmonic is present in the web vibration and then compute the fundamental frequency by the formula $F = f/n$ where $F$ = fundamental frequency, $f$ = harmonic frequency, $n$ = an integer designating the particular harmonic. The particular harmonic mode of vibration is determined by field testing and the method of its determination will be explained later.

The fundamental frequency for a particular web at the desired tension is calculated before initial operation. Knowing the fundamental frequency, this is checked against the reading on the frequency meter after startup. The harmonic mode of vibration is determined. The pressure to air brake 9 is manually adjusted until the reading on the frequency meter equals the determined resonance frequency, which is the fundamental frequency times the harmonic mode. A voltage meter in transducer 7 is adjusted (e.g., 5 millivolts for a 0–10 mv. range) to give a constant pneumatic output which can be multiplied in power to equal the manually determined optimum air brake pressure. Once the system is balanced, any change in frequency due to tension changes will be instantly detected by the frequency meter, adjusted in the transducer, and corrected by changing the air brake pressure. If no automatic system is desired, the transducer 7 and pneumatic power relay 8 may be eliminated and the air brake can be manually operated. In this instance the operator would monitor the frequency meter and, subsequently, control the air brake as needed.

The components used in the preferred embodiment of this invention are as follows. First considering the system used to determine and monitor the web tension, referring to FIGURE 1, the drive speaker 2 is a commercially obtainable 12-inch 8 ohm speaker and it is located on one side of the web. The sensory speaker 4 is a commercially obtainable 4-inch, 45 ohm speaker which acts as a microphone and located on the other side of the web opposite the driving speaker.

The sensory speaker 4 with a 45 ohm impedance is made to look into a 45 ohm primary coil of a matching transformer incorporated in the low pass filter 5. The secondary coil of the transformer matches the nominally accepted range of high impedance amplifier inputs, approximately 200,000 ohms. The signal picked up by the sensory speaker is amplified through a conventional amplifier in which the middle and upper range frequencies are attenuated at 8 decibels per octave above 300 cycles per second to prevent feed-back howl.

In operation sensory speaker 4 acts as a microphone sending its signal through a low pass filter. The filter eliminates all frequencies above 300 cycles per second. From the low pass filter a signal is sent into the amplifier at input 11. The amplifier is commercially available from The Heath Co. and is described in their technical bulletin, 595–677. The output of amplifier 1 is used in two ways. First, it is used to drive speaker number 2 and second, it is used to indicate the frequency of the web.

The frequency of the amplifier signal is measured and indicated on meter 6 which is calibrated in both frequency and tension.

The meter deflection is proportional to the current or the number of pulses passing through it. This current in voltage form is fed to the electro-pneumatic reverse acting transducer 7. A suitable frequency meter is Model AF–1 manufactured by The Heath Co. and described in their publication 595–23.

The control system begins its operations once a voltage signal is emitted from the frequency meter. This voltage signal is a voltage proportional to the frequency of the vibrating web. It is transmitted to a reverse acting electrical pneumatic transducer 7.

The transducer must be reverse acting because an increase in the frequency means an increased tension, since frequency is directly proportional to the square root of the tension. An increase in tension is alleviated by reducing the air pressure to the brake and similarly a decrease in web tension is corrected by increasing the air pressure to the brake. This transducer will receive a voltage signal in the range of 0–10 millivolts and will send out an inversely proportional pneumatic signal in the range of 3 to 15 pounds per square inch. A suitable transducer unit is a Moore Products Model 7711 E/P Transducer, a description of which can be found in Bulletin 7701, published by Moore Products, Philadelphia, Pa.

The pneumatic output signal of transducer 7 is sent to a pneumatic power relay 8. The input pressure to the power relay from the transducer is multiplied by a factor dependent upon the gain setting of the pneumatic power relay.

The amplified output signal is then transmitted directly to the air brake 9. The air brake is designed so that an increase in pressure increases the braking effect thereby causing increased web tension; a decrease in pressure decreases the braking effect thereby relieving tension in the web. A brake that can be used for this purpose is manufactured by Fawick Airflex. A description of the brake and its operation may be found in Fawick Airflex Bulletin No. 400–A.

A specific example will be used to further illustrate the operation of this invention, but it is not intended to be limited to the following detailed example.

Assume the use of a 7-mil thick web with a width of 45½ inches weighing 3.05 grams per centimeter and stretched between two rolls 100 centimeters apart. The desired tension in the web was already known so the application of the formula $$F = \frac{1}{2L}\sqrt{\frac{T}{M}}$$

was applied and solved for F, the fundamental frequency. For the purpose of this problem, assume a desired tension of 1342 lbs. Solving the equation for F we find that F ought to be approximately 70 cycles per second. With the equipment in operation the recorded frequency on frequency meter 6 was 210 cycles per second. Now the characteristic frequency and the harmonic mode that the web was oscillating at during its resonance, was determined experimentally. This may be done in a number of ways, only two ways will be explained.

(1)

(a) Excite the drive speaker by means of a variable audio-frequency oscillator;
(b) Attach the sensory speaker to a volt meter;
(c) As the frequency of the audio oscillator is increased, a noticeable voltage increase occurs when the frequency of the audio oscillator coincides with the frequency of some harmonic mode of oscillation of the web.

The lowest frequency at which this occurs is the fundamental frequency of the web. The frequency that gives the highest voltage reading is the resonant frequency. In the case of a vibrating web the resonant frequency is some integral multiple of the fundamental frequency.

(2)

(a) Cover the web over the distance L with chalk dust;
(b) Turn the amplifier on to excite the drive speaker causing the web to seek its resonant frequency.

When the resonant frequency is reached and maintained, the chalk dust will move about the web and accumulate along the nodal lines. By noting the pattern of nodal lines and by noting the frequency at which the pattern occurs, one can determine the harmonic mode for the resonant frequency.

The harmonic mode at the resonant frequency was determined by method 1 above using the audio oscillator to excite the driving speaker and measuring the voltage picked up by the sensory speaker. While the audio oscillator frequency was being varied, the existing noise level established a reference voltage level which was picked up by the sensory speaker attached to a voltmeter. When 70 cycles per second was reached, there was a noticeable voltage increase. This indicated that 70 cycles per second was the fundamental period of vibration. As the audio oscillator frequency was further increased, another recorded voltage peak occurred at 140 cycles per second but the highest voltage peak occurred at 210 cycles per second. This indicated that the resonant frequency of the web was 210 cycles per second vibrating in its 3rd harmonic. The particular harmonic is determined by dividing the resonant frequency by the fundamental frequency. With the test equipment disconnected and the amplifier 1 used to excite the drive speaker 2, in turn, vibrating the web 3, an operator reading frequency meter would read the resonant frequency of 210 cycles per second. Knowing that the web is vibrating in its 3rd harmonic would allow the computation for tension.

$$F = \frac{1}{2L}\sqrt{\frac{T}{M}}$$

$F$ = fundamental frequency in cycles per second = 210/3 = 70
$L$ = length in centimeters = 100
$T$ = tension in dynes = ?
$M$ = mass per unit length in grams per centimeter = 3.05

Solving the equation for tension with the foregoing figures $$T = M(2LF)^2$$

conversion factor $10^6$ dynes = 2.248 lbs.

$$T = \frac{M(2LF)^2(2.248)}{10^6}$$

$$T = \frac{2.248(3.05)\left(2 \times 100 \times \frac{210}{3}\right)^2}{10^6}$$

$T$ = 1342 lbs.

If the tension is too high or too low, a manual adjustment of the air supply to the brake is made. By manually adjusting the air to the air brake and noting the frequency response of the vibrating web, the calculated frequency for the desired tension is obtained. Once the initial setup for a particular web is made, the desired tension is monitored and controlled automatically. For example, if the vibrating frequency of the web increases this means the tension has increased and the braking effect will have to be reduced. This is accomplished by the control means beginning with the reverse acting, electro-pneumatic transducer 7 sensing an increase in voltage from the frequency meter 6. The transducer 7 takes the increased voltage signal and converts it to a reduced pneumatic signal. This reduced pneumatic signal is proportionally increased in the power relay and sent to the air brake to release to some degree and the web tension created by the air brake.

On the other hand, if the vibrating frequency of the web decreases this means that the tension has decreased and the braking effect will have to be increased. This is accomplished by the control means beginning with the reverse acting electro-pneumatic transducer 7 sensing a decrease in voltage from the frequency meter 6. The transducer 7 takes the decreased voltage signal and converts it to an increased pneumatic signal. This increased pneumatic signal is proportionally multiplied in the power relay and sent to the air brake to increase the braking power and the tension accordingly increases.

If there is no change in frequency of the web, the transducer will receive a constant voltage signal equal to that which it was initially adjusted. Consequently, the voltage will be constant in the transducer and its pneumatic output will be constant thereby insuring no change in braking action.

For convenience, the frequency gage may be graduated to read directly in tension units for a given web.

The described apparatus can be modified in many ways without departing from the spirit of the invention. Thus, different sized speakers may be used with matching filter and amplifier. The pneumatic braking system may be replaced by an electrical braking system or a hydraulic braking system. Means can be added to locate the amplifier and control components on a control board. Instead of a braking system to maintain tension, a takeup roll may be positively driven, e.g., by an electrical motor, and the take-up speed can be governed by the transducer signal to insure proper tension between the rolls.

An advantage of this invention is that it provides a method of measuring web tension without contacting the web. Another advantage is that it provides a method of continuously measuring, monitoring and controlling web tension. Further advantages are that the embodiment of the invention is constructed of commercially obtainable equipment, is dependable in operation, provides accurate results and requires no particular skill to operate.

The embodiments of the invention in which an exclusive property or privilege is claimed are defined as follows:

1. An apparatus for determining the tension of a web having a known mass and held between two fixed points which comprises:
   (a) detecting means located in non-contacting relationship on one side of a web which means will issue a signal responsive to gas vibration induced by the vibrations of said web,
   (b) amplifying means for increasing the power of said signal issued by said detector, and
   (c) means for activating the web in response to the output of said amplifier by inducing air vibrations, said activating means being located on the opposite side of said web from said detecting means.

2. An apparatus as defined in claim 1 where said detecting means (a) is a microphone.

3. An apparatus as defined in claim 1 where said detected signal passes through a frequency filter means before passing into the amplifier.

4. An apparatus as defined in claim 1 where said activating means (c) is a speaker.

5. An apparatus as defined in claim 1 having in combination with said components metering means to indicate the frequency of the web vibration.

6. An apparatus as defined in claim 5 where the indicating means is a volt meter.

References Cited

UNITED STATES PATENTS

| | | | |
|---|---|---|---|
| 2,576,423 | 11/1951 | Stewart | 73—67.2 |
| 2,618,970 | 11/1952 | Hitchcock et al. | 73—143 |
| 2,716,887 | 9/1955 | Smith | 73—67.2 |
| 2,755,032 | 7/1956 | Justus | 242—75 |
| 2,923,150 | 2/1960 | Imboden et al. | 73—143 |

RICHARD C. QUEISSER, *Primary Examiner.*

CHARLES A. RUEHL, *Assistant Examiner.*